United States Patent
Shumsky et al.

(10) Patent No.: US 9,276,868 B2
(45) Date of Patent: Mar. 1, 2016

(54) MAINTAINING PACKET ORDER IN A PARALLEL PROCESSING NETWORK DEVICE

(71) Applicant: Marvell Israel (M.I.S.L.) Ltd., Yokneam (IL)

(72) Inventors: Evgeny Shumsky, Petah Tikva (IL); Gil Levy, Hod Hasharon (IL); Adar Peery, Aseret (IL); Amir Roitshtein, Holon (IL); Aron Wohlgemuth, Givat Shmuel (IL)

(73) Assignee: MARVELL ISRAEL (M.I.S.L) LTD., Yokneam (IL)

( * ) Notice: Subject to any disclaimer, the term of this patent is extended or adjusted under 35 U.S.C. 154(b) by 94 days.

(21) Appl. No.: 14/109,479

(22) Filed: Dec. 17, 2013

(65) Prior Publication Data

US 2014/0169378 A1      Jun. 19, 2014

Related U.S. Application Data

(60) Provisional application No. 61/825,223, filed on May 20, 2013, provisional application No. 61/780,186, filed on Mar. 13, 2013, provisional application No. 61/768,069, filed on Feb. 22, 2013, provisional application No. 61/738,264, filed on Dec. 17, 2012.

(51) Int. Cl.
*H04L 12/863* (2013.01)
*H04L 12/939* (2013.01)

(52) U.S. Cl.
CPC ............ *H04L 47/624* (2013.01); *H04L 49/552* (2013.01); *H04L 47/50* (2013.01)

(58) Field of Classification Search
CPC ..... H04L 47/624; H04L 49/552; H04L 47/00; H04L 47/10; H04L 47/22; H04L 47/24; H04L 47/2441; H04L 47/50
See application file for complete search history.

(56) References Cited

U.S. PATENT DOCUMENTS

| | | | | |
|---|---|---|---|---|
| 5,764,895 A | * | 6/1998 | Chung | 709/250 |
| 7,924,860 B1 | * | 4/2011 | Frailong | H04L 49/552 |
| | | | | 370/413 |

(Continued)

FOREIGN PATENT DOCUMENTS

WO      WO-99/07180      2/1999

OTHER PUBLICATIONS

International Search Report and Written Opinion for International Application No. PCT/IB2013/003195, mailed Jun. 3, 2014.

(Continued)

*Primary Examiner* — Anh Ngoc Nguyen

(57) ABSTRACT

A plurality of packets are received by a packet processing device, and the packets are distributed among two or more packet processing node elements for processing of the packets. The packets are assigned to respective packet classes, each class corresponding to a group of packets for which an order in which the packets were received is to be preserved. The packets are queued in respective queues corresponding to the assigned packet classes and according to an order in which the packets were received by the packet processing device. The packet processing node elements issue respective instructions indicative of processing actions to be performed with respect to the packets, and indications of at least some of the processing actions are stored. A processing action with respect to a packet is performed when the packet has reached a head of a queue corresponding to the class associated with the packet.

20 Claims, 5 Drawing Sheets

(56) References Cited

U.S. PATENT DOCUMENTS

| | | | |
|---|---|---|---|
| 8,111,690 B2 | 2/2012 | Hussain et al. | |
| 2006/0239194 A1* | 10/2006 | Chapell | 370/235 |
| 2008/0114887 A1 | 5/2008 | Bryers et al. | |
| 2009/0296580 A1* | 12/2009 | Williams, Jr. | H04L 49/90 370/235 |
| 2012/0002546 A1 | 1/2012 | Sundararaman et al. | |
| 2012/0177047 A1 | 7/2012 | Roitshtein | |
| 2013/0070584 A1* | 3/2013 | Hutchison et al. | 370/216 |
| 2014/0177470 A1 | 6/2014 | Roitshtein et al. | |
| 2014/0192815 A1 | 7/2014 | Shumsky et al. | |
| 2015/0172188 A1 | 6/2015 | Levy et al. | |

OTHER PUBLICATIONS

International Search Report and Written Opinion for corresponding PCT Application No. PCT/IB2014/000865 dated Aug. 26, 2014 (13 pages).

Shumsky, et al, "Multithreaded Parallel Packet Processing in Network Devices," U.S. Appl. No. 14/092,521, filed Nov. 27, 2013 (27 pages).

Kadosh, et al, "Multi-Stage Interconnect Network in a Parallel Processing Network Device," U.S. Appl. No. 14/482,980, filed Sep. 10, 2014 (46 pages).

Levy, et al, "Packet Parsing and Key Generation in a Network Device," U.S. Appl. No. 14/516,500, filed Oct. 16, 2014 (50 pages).

Wohlgemuth, et al., "Processing Concurrency in a Network Device," U.S. Appl. No. 14/516,529, filed Oct. 16, 2014 (59 pages).

Wohlgemuth, et al., "Processing Concurrency in a Network Device," U.S. Appl. No. 14/517,570, filed Oct. 17, 2014 (51 pages).

Shpiner et al., "Reducing the Reordering Delay in Multi-Core Network Processors", Technical Report TR12-01, Comnet, Technion, Israel, Jan. 2012, 12 pages.

International Preliminary Report on Patentability in International Application No. PCT/IB2013/003195, dated Jul. 2, 2015 (8 pages).

U.S. Appl. No. 14/574,088, Levy et al., "Increasing Packet Processing Rate in a Network Device," filed Dec. 17, 2014.

U.S. Appl. No. 14/610,834, Levy et al., "Packet Distribution with Prefetch in a Parallel Processing Network Device," filed Jan. 30, 2015.

* cited by examiner

MAINTAINING PACKET ORDER IN A PARALLEL PROCESSING NETWORK DEVICE

CROSS-REFERENCE TO RELATED APPLICATION

This disclosure claims the benefit of the following U.S. Provisional Patent Applications:

U.S. Provisional Patent Application No. 61/738,264, entitled "Packet Reorder Method in Parallel Processing Packet Processor," filed on Dec. 17, 2012;

U.S. Provisional Patent Application No. 61/768,069, entitled "Lock Mechanism," filed on Feb. 22, 2013;

U.S. Provisional Patent Application No. 61/780,186, entitled "Packet Reorder Method in Parallel Processing Packet Processor," filed on Mar. 13, 2013; and U.S. Provisional Patent Application No. 61/825,223, entitled "Packet Reorder Method in Parallel Processing Packet Processor," filed on May 20, 2013.

The disclosures of all of the above-referenced patent applications are hereby incorporated by reference herein in their entireties.

FIELD OF THE DISCLOSURE

The present disclosure relates generally to network devices such as switches, routers, and edge devices, and more particularly to systems and methods for processing communication packets in such devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some network devices, such as network switches, routers, edge devices and the like employ parallel packet processing of packet streams in which multiple packet processing elements simultaneously and in parallel perform processing of different packets. In such embodiments, it is important to efficiently utilize multiple processing elements to concurrently perform parallel processing of packets belonging to a data flow while efficiently maintaining an order of packets within the data flow.

SUMMARY

In one embodiment, a method for preserving an order of packets in a packet processing device includes receiving a plurality of packets via a plurality of ports of the packet processing device, and distributing the packets among two or more packet processing node elements for processing of the packets. The method also includes assigning the packets to respective packet classes based on one or more attributes associated with the packets, wherein each packet class corresponds to a group of packets for which an order in which the packets were received is to be preserved when transmitting the packets, and queuing the packets in respective queues corresponding to the assigned packet classes and according to an order in which the packets were received by the packet processing device. The method further includes issuing, by the packet processing node elements, respective instructions indicative of processing actions to be performed with respect to the packets, and storing indications of at least some of the processing actions. The method additionally includes performing a processing action with respect to a packet when the packet has reached a head of a queue corresponding to the class associated with the packet.

In other embodiments, the method includes any combination of one or more of the following elements.

The method further includes performing, by the packet processing elements, processing operations on the packets, including performing at least some processing operations independently of respective locations of the packets in the respective queues.

Queuing the packets in respective queues includes, prior to assigning the packets to respective packet classes, queuing the packets in one or more default class queues.

Queuing the packets in one or more default class queues comprises queuing the packets in respective default class queues corresponding to respective source ports via which the packets were received by the packet processing device.

The method further includes assigning respective packet IDs to the packets, wherein queuing the packets in the respective queues comprises queuing the packet IDs assigned to the packets in the respective queues.

Assigning respective packet IDs comprises assigning respective IDs from a pool of non-sequential free packet IDs.

Performing the processing action with respect to the packet comprises one of (i) updating a class corresponding to a packet to a new packet class assigned to the packet, (ii) forwarding the packet, or (iii) dropping the packet.

Forwarding the packet comprises causing the packet to be sent to a target port for transmission of the packet via the target port, removing a packet ID corresponding to the packet from a queue in which the packet ID is queued, and returning the packet ID to a pool of free packet IDs.

Updating the class corresponding to the packet to the new packet class comprises moving the packet ID corresponding to the packet to a tail of a queue corresponding to the new packet class.

The method further includes providing, to the packet processing element, notifications indicating packets that are at heads of respective queues, and wherein the packet processing elements are configured to delay performing some packet processing operations on a packet until the packet is at the head of a queue.

In another embodiment, a network device comprises a plurality of network ports configured to receive and to transmit packets on a network and a plurality of packet processing node elements configured to process packets received via the network ports. The network device also comprises an ordering unit configured to distributing packets among two or more packet processing node elements for processing of the packets, wherein the packet processing node elements are configured to process the packets and to assign the packets to respective packet classes based on one or more attributes associated with the packets, each packet class corresponding to a group of packets for which an order in which the packets were received is to be preserved when transmitting the packets. The ordering unit is also configured to queue the packets in respective queues corresponding to the assigned packet classes and according to an order in which the packets were received by the packet processing device. The ordering unit is further configured to receive, from the packet processing node elements, respective instructions indicating packet processing actions to be taken with respect to the packets, and store at least some of the instructions. The network device is additionally configured to perform a packet processing operation indicated by an instruction corresponding to a packet when the packet has reached a head of a queue corresponding to the class associated with the packet.

In other embodiments, the network device includes any combination of one or more of the following features.

The packet processing node elements are configured to perform at least some processing operations independently of respective locations of the packets in the respective queues.

The ordering unit is configured to, before the packets are assigned to the packet classes, queue the packets in respective one or more default class queues.

The ordering unit is configured to queue the packets in respective one or more default class queues corresponding to respective source ports via which the packets were received by the packet processing device.

The ordering unit is further configured to assign respective packet IDs to the packets, and wherein queuing the packets in the respective queues comprises queuing the packet IDs assigned to the packets in the respective queues.

The ordering unit is configured to assign the respective packet IDs from a pool of non-sequential free packet IDs.

The processing action that the ordering unit is configured to perform with respect to the packet comprises one of (i) updating a class corresponding to a packet to a new packet class assigned to the packet, (ii) forwarding the packet, or (iii) dropping the packet.

The ordering unit is configured to forwarding the packet at least by causing the packet to be sent to a target port for transmission of the packet via the target port, removing the packet ID corresponding to the packet from the queue in which the packet ID is queued, and returning the packet ID to a pool of free packet IDs.

The ordering unit is configured to, when update the class corresponding to the packet to the new packet class at least by moving the packet ID corresponding to the packet to a tail of a queue corresponding to the new packet class.

The ordering unit is further configured to provide, to the packet processing elements, notifications indicating packets that are at heads of respective queues, and wherein the packet processing elements are configured to delay performing at least some packet processing operations on a packet until the packet is at the head of a queue.

DETAILED DESCRIPTION

Figure 1:
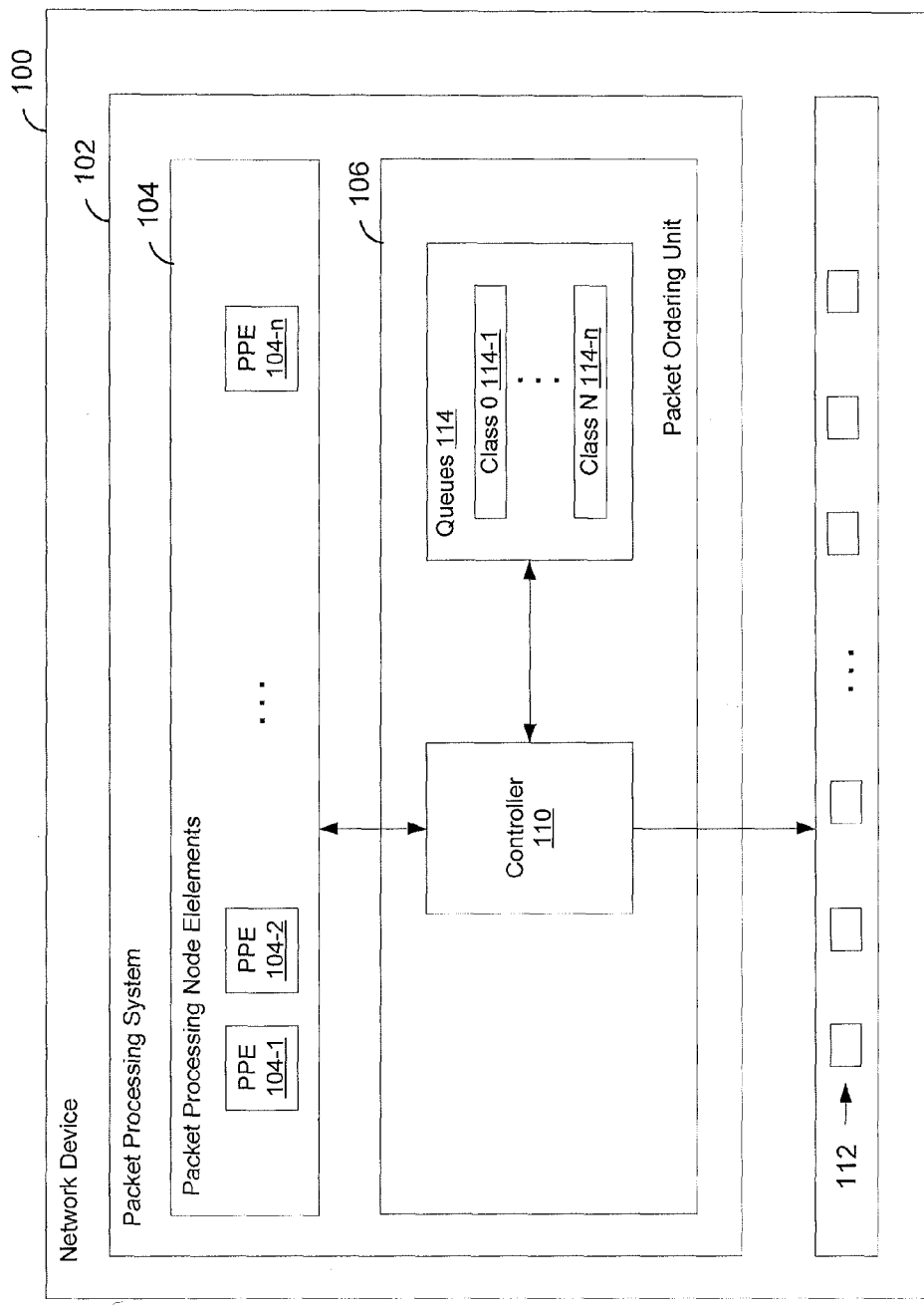
FIG. 1 is a simplified block diagram of an example network device configured according to an embodiment of the present disclosure to efficiently process network packets using a plurality of packet processing elements while maintaining an order of at least some of the packets when transmitting the packets.

FIG. 1 is a simplified block diagram of an example network device 100 configured to efficiently process network packets using a plurality of packet processing elements while maintaining an order packets in data flows processed by the network device 100, according to an embodiment. The network device 100 is generally a computer networking device that connects two or more computer systems, network segments, subnets, and so on. For example, the network device 100 is a switch, in one embodiment. It is noted, however, that the network device 100 is not necessarily limited to a particular protocol layer or to a particular networking technology (e.g., Ethernet). For instance, the network device 100 could also be a bridge, a router, a VPN concentrator, etc.

The network device 100 includes a packet processor 102, and the packet processor 102, in turn, includes a plurality of packet processing node elements (PPEs) 104 and an ordering unit 106. The network device 100 also includes a plurality of network ports 112 coupled to the packet processor 102, and each of the network ports 112 is coupled via a respective communication link to a communication network and/or to another suitable network device within a communication network. Generally speaking, the packet processor 102 is configured to process packets received via ingress ports 112, to determine respective egress ports 112 via which the packets are to be transmitted, and to transmit the packets via the determined egress ports 112. In some embodiments, the packet processor 102 processes packet descriptors associated with the packets rather than processing the packets themselves. A packet descriptor includes some information from the packet, such as some or all of the header information of the packet, and/or includes information generated for the packet by the network device 100, in an embodiment. In some embodiments, the packet descriptor includes other information as well such as an indicator of where the packet is stored in a memory associated with the network device 100. For ease of explanation, the term "packet" herein is used to refer to a packet itself or to a packet descriptor associated with the packet.

The ordering unit 106 includes a controller 110 configured to distribute processing of packets received by the network device 100 via the ports 112 to the plurality of PPEs 104. The PPEs 104 are configured to concurrently, in parallel, perform processing of respective packets, and each PPE 104 is generally configured to perform at least two different processing operations on the packets, in an embodiment. According to an embodiment, the PPEs 104 are configured to process packets using computer readable instructions stored in a non-transitory memory (not shown), and each PPE 104 is configured to perform all necessary processing (run to completion processing) of a packet. In operation, the network device 100 processes one or more data flows that traverse the network device 100. In an embodiment, a data flow corresponds to a sequence of packets received by the network device 100 via a certain source port 112 (e.g., from a certain originating device) and destined for transmission via a certain target port 112 (e.g., to a certain target device coupled to the target port), and, in some embodiments, is associated with one or more other parameters, such as a priority level relative to other data flows. Typically, order of data packets in a data flow needs to be maintained through the network device 100 such that the order in which the packets are transmitted from the network device 100 is the same as the order in which the packets were received by the network device 100. However, because processing of packets in a data flow is distributed among multiple ones of the PPEs 104, processing of the packets in a data flow is completed by the PPEs 104 in an order different than the order in which the packets were received by the network device 100, in at least some situations. Out of order completion of processing of the packets is due, for example, to variance in latency encountered by different PPEs 104 when accessing an external resource, such as external memory, an external processing engine, etc. for performing a processing operation on a packet.

In an embodiment, the ordering unit 106 is configured to maintain order of at least the packets belonging to a same data flow entering the network device 100 to ensure that these packets are transmitted from the network device 100 in the order in which the packets were received by the network device 100. To efficiently maintain the order of packets, the controller 110 operates on a plurality of queues 114-1 through 114-$n$ corresponding to respective packet classes, and maintains the order of packets within each class of the plurality of classes. A packet class corresponds to a group of packets that share one or more attributes associated with the packets, in various embodiments. For example, a packet class corresponds to a group of packets that belong to a same data flow, a group of packets that belong to several data flows (e.g., several data flows that share a priority level), packets that share a number of instructions that the PPEs 104 need to execute in order to process the packets, a group of packets that share an expected processing time, or a group of packets that share any other suitable attribute or suitable combinations of attributes associated with the packets. In an embodiment, the classes are predefined in the network device 100. In another embodiment, at least some of the classes are configurable by an operator of the network device 100.

In an embodiment, the controller 110 queues the packets in respective queues 114 corresponding to respective packet classes associated with the packets according to an order in which the packets were received by the network device 100. In an embodiment, the controller 110 assigns packet IDs to the packets, and queues the packet IDs assigned to the packets, rather than the packets themselves, in the queues 114. In an embodiment, the controller 110 assigns the packet IDs from a pool of non-sequential free packet IDs. In this embodiment, packet IDs assigned to packets in a sequence of packets received by the network device 100 do not necessarily represent the order of in which the packets were received by the network device 100. The controller 110 then distributes the packets to the PPEs 104 for processing of the packets by the PPEs 104. In an embodiment, the PPEs 104 generally process the packets independently of the order in which the packets are queued in the queues 114. In an embodiment, the PPEs 104 are configured to perform at least some processing operations on the packets independently of respective locations of the packets in the respective queues 114. The PPEs 104 communicate with the ordering unit 106, for example to instruct the ordering unit 106 to take certain actions with respect to the packets queued in the queues 114. For example, the PPEs 104 are configured to issue instructions indicative of actions to be taken with the packets, such as updating a class corresponding to a packet, forwarding a packet to a target port 112 for transmission of the packet via the target port 112, dropping the packet, etc., and to send the instructions indicative of the actions to the ordering unit 106. In other embodiment, other processing elements of the network device 100 instruct the ordering unit 106 to perform an action with respect to a packet, such as to update a class corresponding to a packet. For example, at least some such instructions are sent to the ordering unit 106 from a hardware element (e.g., a hardware processing engine or a lookup memory, such as a ternary content addressable memory (TCAM), for example) that is engaged or accessed by a PPE 104 to determine the class of the packet, in an embodiment.

In various embodiments described below, the controller 110 maintains order of packets queued in a same queue 114 by performing actions with respect to a packet queued in the queue 114 when the packet is at the head of the queue 114. As such, a packet at the head of a queues 114 prevents the controller 110 from performing actions with respect to other packets queued in the same queue 114, thereby blocking the other packets queued in the same queue 114. In other words, because actions with respect to packets queued in a queue 114 are performed only when the packets are at the head of the queue 114, in an embodiment, the controller 110 delays performing an action with respect to a packet received by the network device 100 at a relatively later time until an action with respect to a packet received at a relatively earlier time is performed, thereby preserving the order of packets queued in the queue 114.

In an embodiment, the queues 114 are implemented using respective linked lists. In this embodiment, each queue 114 links a group of packets via a sequence of entries each of which contains a reference to a next entry in the queue, in an embodiment. Implementing the queues 114 as respective linked lists allows the controller 110 to efficiently utilize a memory space for storing the plurality of queues 114. In another embodiment, the queues 114 are implemented in other suitable manners, for example as First In First Out (FIFO) queues.

According to an embodiment, a class to which a packet corresponds is determined during processing of the packet by a PPE 104 or by another processing element (e.g., an external hardware engine engaged to determine the packet class by the PPE 104) . . . . Accordingly, the class to which a packet corresponds is not yet known when the packet is received by the ordering unit 106 and initially enqueued in the ordering unit 106. In an embodiment, the controller 110 is configured to initially enqueue the packets in one or more default class queues. For example, in some embodiments, the queues 114 include multiple default queues 114, with each default queue 114 queuing packets that share a certain parameter that is known to the controller 110 prior to processing of the packets by the PPEs 104. For example, in one such embodiment, the queues 114 include respective default queues 114 for each of the source ports 112 serviced by the ordering unit 106 (e.g., each of all of the source ports 112 or each of some of the source ports 112). In this embodiment, the controller 110 is configured to enqueue a packet in a default queue 114 that corresponds to the source port 112 via which the packet was received by the network device 100. In this embodiment, packets that enter the network device 100 via different ones of the source ports 112 are queued in different default class queues 114, and a packet that entered the network device 100 via a first port 112 (e.g., the ports 112-1) will not unnecessarily block a packet that entered the network device 100 via a second port 112, in an embodiment. In another embodiment, though, the queues 114 include a single default class queue for initially queuing all packets that are enqueued by the controller 110 in the ordering unit 106. In this embodiment, the controller 110 initially enqueues a packet in the single default queue 114.

Alternatively, in another embodiment, the controller 110 is configured to initially enqueue the packets in all of the queues 114. In this embodiment, the controller 110 is configured to receive an update for a packet indicating that the packet does not belong to one or multiple ones of the packet classes corresponding to certain one or multiple ones of the queues 114. In response to receiving an update corresponding to a packet, the controller 110 removes the packet from the one or the multiple ones of the queues 114 corresponding to the indicated class or classes. In an embodiment, the controller 110 is configured to remove the packet from the queues corresponding to the packets when the packet is at the head of the queue from which the packet is to be removed.

In an embodiment, the PPEs 104 analyze at least some of the packets being processed by the PPEs 104 to determine respective packet classes corresponding to the at least some of the packets based on one or more attributes associated with the packets (e.g., based on one or more parameters in a header of a packet, based on one or more parameters calculated for the packet during processing of the packet by the packet processor 102, a combination thereof, or any other suitable parameter or parameters included in or associated with the packet). The PPEs 104 are configured to selectively provide updates corresponding to at least some of the packets to the ordering unit 106 and, more specifically, to the controller 110 of the ordering unit 106, indicating to the ordering unit 106 that classes particular classes to which the packets correspond. In an embodiment, the PPEs 104 provide class updates with respect to some of the packets (e.g., packets for which processing time is expected to be relatively long), and does not provided updates to the ordering unit 106 with respect to other packets (e.g., packets for which processing time is expected to be relatively short).

In an embodiment, the ordering unit 106 receives multiple updates for a packet during processing of the packet by the PPEs 104 and/or other processing elements of the network device 100. For example, the ordering unit 106 receives an instruction for a packet indicating that the packet should be moved to a temporary class before an actual class to which the packet belongs has been determined by the PPE 104 or other processing element of the network device 100. In response to receiving the instruction indicating that a packet should be moved to a temporary class, the ordering unit 106 moves the packet from the queue 114 in which the packet is currently queued to another one of the queues 114, for example to a queue 114 corresponding to a current class of the packet incremented by an integer, such as one (e.g., class 0 incremented by one to class 1). Subsequently, the ordering unit 106 receives one or more additional temporary class updates corresponding to the packet until an actual class is determined for the packet. Performing temporary class updates for a packet allows to unblock other packets in the queue in which the packet is currently queued prior to determining the class to which the packet corresponds, in at least some embodiments.

According to an embodiment, when the ordering unit 106 receives a class update for a particular packet, the controller 110 of the ordering unit 106 moves the packet from a queue 114 in which the packet is currently queued to a new queue 114 corresponding to a class indicated by the class update for the particular packet. In an embodiment, to properly maintain order of packets, the controller 110 does not move packets to new queues 114 until the packets reach heads of queue in which the packets are currently queued. Thus, when the controller 110 receives a class update corresponding to a packet, the controller 110 checks whether the packet is at the head of the queue in which the packet is queued, or, alternatively, checks whether the packet is at the head of any of the queues 114, and performs the class update (e.g., moves the packet to the queue 114 corresponding to the class indicated by the class update) if the packet is currently at the head of a queue 114. If the packet is not currently at the head of a queue 114, the controller 110 suitably associates the update action with the packet and waits, until the packet reaches the head of the queue in which the packet is queued, to actually perform the update.

In some embodiments and/or scenarios, the ordering unit 106 receives a second class update for a packet prior to a previously received class update for the packet has been performed by the ordering unit 106, such as when the packet has not yet reached the head of the queue in which the packet was queued prior the previous update was received by the ordering unit 106. In such cases, the controller 110 suitably associates an update action corresponding to the second update with the packet, in an embodiment. Accordingly, in this case, both a first update actions corresponding to the previously received class update and a second update action corresponding to the second class update are associated with the packet. The controller 110 performs each of the first and the second update actions when the packet reaches the head of the relevant queue 114, in an embodiment. In other words, the controller 110 performs the first update action when the packet reaches the head of the queue 114 in which the packet is currently queued, and performs the second class update when the packet reaches the head of the queue 114 to which the packet is moved according to the first update action, in an embodiment.

In an embodiment, when a PPEs 104 completes processing of a packet, the PPE 104 send an instruction to the ordering unit 106 indicating to the ordering unit 106 that processing of the packet has been completed. When the controller 110 of the ordering unit 106 receives an instruction from a PPE 104 indicating that processing of a packet has been completed by the PPE 104, the controller 110 waits until the packet reaches the head of the queue 114 in which the packet is queued, and then causes the packet to be sent to an appropriate target port 112 for transmission of the packet via the port 112. Because the controller 110 performs an action with respect to a packet (i.e., updating a class for a packet, sending a packet to a target port for transmission of the packet, dropping a packet etc.) when the packet is at the head of the queue 114 in which the packet is currently queued in the ordering unit 106, the controller 110 ensures that packet order is maintained within the queue 114, as will be explained in more detail below, in various embodiments and/or scenarios.

Additionally, in some embodiments, the ordering unit 106 is configured to provide various information to the PPEs 14, such as information regarding state of the queues 114 and/or information regarding state of the instructions received from the PPEs 104. The ordering unit 106 is configured to send some of the packets to the PPEs 104 without assigning packet IDs to the packets and/or without enqueuing the packets in the ordering unit 106, in some embodiments and/or scenarios.

Figure 2:
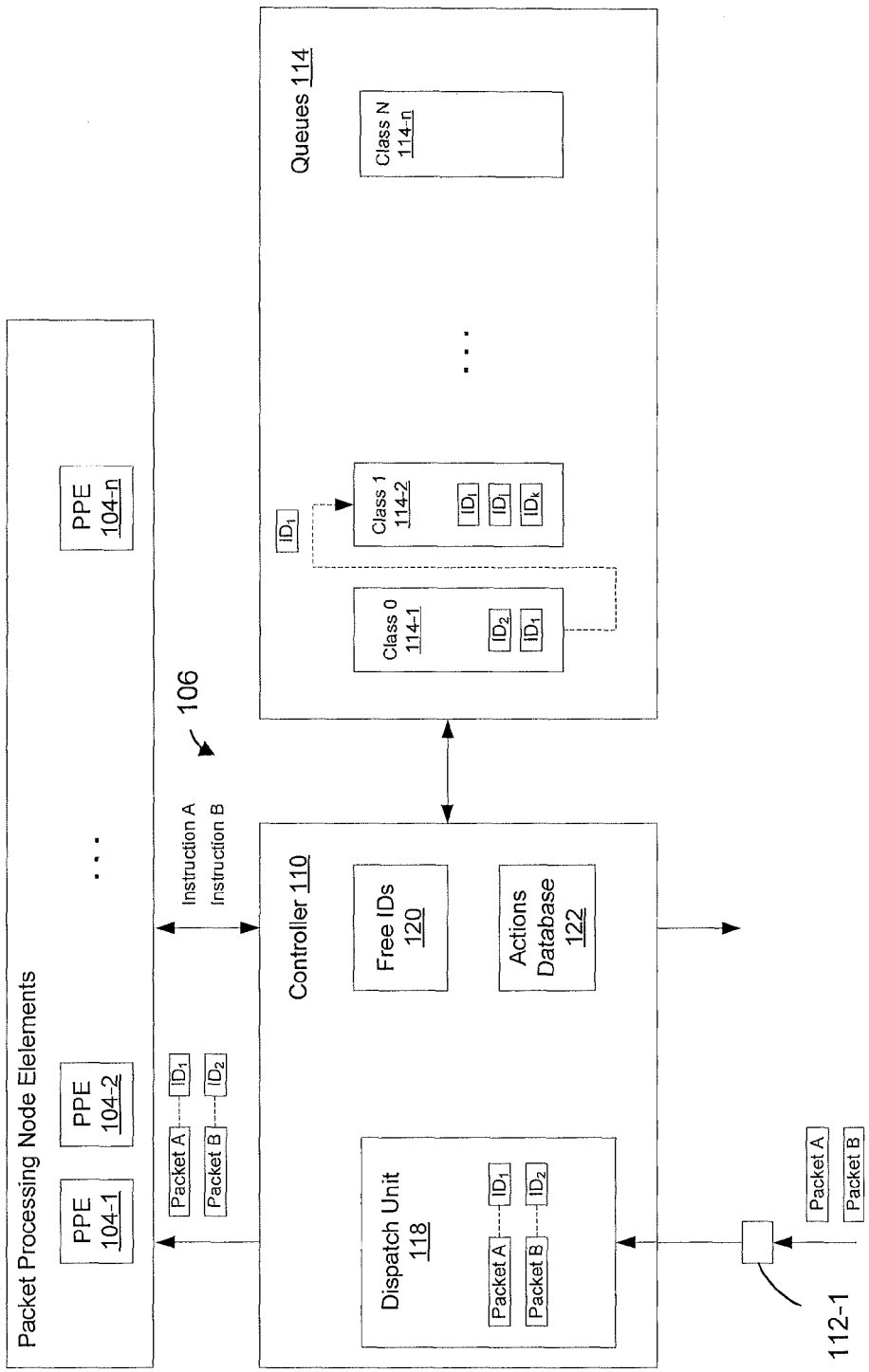
FIG. 2 is a diagram of an example packet ordering unit, according to an embodiment.

FIG. 2 illustrates the ordering unit 106 of FIG. 1 in more detail, according to an embodiment. In the embodiment of FIG. 2, the controller 110 includes a dispatch unit 118 configured to assign respective packet IDs to packets, and to send the packets to the PPEs 104 for processing of the packets by the PPEs 104. The controller 110 includes or is coupled to a free IDs unit 120 and an actions database 122. The dispatch unit 118 uses a list of free IDs contained in the unit 120 to assign packet IDs to packets prior to sending the packets to PPEs 104 for processing of the packets by the PPEs 104. In an embodiment, the free IDs unit 120 includes a queue of free IDs such as a FIFO or a linked list queue of free IDs. In another embodiment, the free IDs unit 120 includes another suitable record (e.g., a table or a database) of free IDs and/or includes an ID generator. In an embodiment, the dispatch unit 118 suitably associates each packet and the packet ID assigned to the packet, and sends the packet along with the packet ID to a PPE 104. The PPE 104 uses the packet ID associated with the packet to communicate with the ordering unit 106, for example to send instructions, to the controller 110, indicative of actions to be taken with respect to the packets by the controller 110.

In an embodiment, the controller 110 is configured to enqueue the packet IDs assigned to the packets in the queues 114 according to an order in which the packets were received by the network device 100. In the embodiment illustrated in FIG. 2, the network device 100 receives a packet A and a packet B via the port 112-1. As illustrated in FIG. 2, the packet A enters the network device 100 at an earlier time relative to the time at which the packet B enters the network device 100. The ordering unit 106 receives the packet A, assigns a packet ID1 to the packet A, and sends the packet along with the packet ID1 assigned to the packet A to a first PPE 104 (e.g., the PPE 104-1) for processing of the packet. Also, the ordering unit 106 enqueues the packet ID1 assigned to the packet A in a default queue 114-1 corresponding to the source port 112-1 via which the packet A was received by the network device 100. Similarly, the ordering unit 106 receives the packet B, assigns a packet ID2 to the packet B, and sends the packet B along the packet ID2 assigned to the packet B to a second PPE 104 (e.g., the PPE 104-2) for processing of the packet B by the second PPE 104. Because the packet A and the packet B are both received by the network device 100 via the port 112-1 and, therefore, the packet A and the packet B are associated with the same port 112-1, the packet A and the packet B are queued in the same default queue 114-1, in an embodiment. Further, because packet A entered the network device 100 before packet B entered the network device 100, packet A is queued in the queue 114-1 ahead of the packet B, in an embodiment.

Subsequently, the controller 110 receives, from the PPE 104-1, an instruction A indicative of an action to be taken with respect to the packet A, and receives from the PPE 104-2, an instruction B indicative of an action to be taken with respect to the packet B. As illustrated in FIG. 2, the controller 110 receives the instruction B before receiving the instruction A, in the illustrated embodiment and scenario. The controller 110 checks whether the ID2 associated with the packet B is at the head of the queue 114-1. Because the ID2 is not at the head of the queue 114-1, the controller 110 does not take the action indicated by the instruction B. Rather, the controller 110 associates the action indicated by instruction B with the packet B, for example by storing an association between the action indicated by the instruction B and the ID2 associated with the packet B in the actions database 122. Then, the controller 110 receives the instruction A indicating the action to be taken with respect to the packet A, and checks whether the ID1 associated with the packet A is at the head of the queue 114-1. Because the ID1 is at the head of the queue 114-1, the controller 110 performs the action indicated by the instruction A. In the embodiment of FIG. 2, the instruction A indicates an update to the packet class for the packet A. In particular, the instruction A indicates that the packet A belongs to the packet class 1, in an example embodiment. Alternatively, in another embodiment, the instruction A is issued by the PPE 104-1 prior to a class having been assigned to the packet A by the PPE 104-1. In this case, the instruction A indicates that the packet A should be moved to a new class without indicating the specific new class. In this case, the controller 110 determines a new packet class for the packet A in any suitable manner, for example by incrementing the current class corresponding to the packet A (e.g., incrementing class 0 to class 1), and moves the packet ID1 to the determined new class for the packet A by removing the ID1 from the head of the queue 114-1 corresponding to the packet class 0 and adding the packet ID1 to the tail of the queue 114-2 corresponding to the packet class 1.

As another example, when the instruction A indicates that processing of the packet A is completed and the packet A is ready to be forwarded to a target port 112 for transmission of the packet A via the target port 112, the controller 110 causes the packet A to be sent for transmission to the target port 112, removes the packet ID1 from the queue 114-1, and releases the packet ID1 for example by returning the packet ID1 to the pool of free IDs 120, in an embodiment. As yet another example, the instruction A indicates that the packet A should be dropped, the controller 110 removes the ID1 from the queue 114-1 and returns the ID1 to the pool of free IDs 120, in an embodiment.

After the action is performed with respect to the packet A, the packet ID2 corresponding to the packet B moves to the head of the queue 114-1. The controller 110 checks whether an instruction indicating an action to be taken with respect to packet B has been received by the controller 110. For example, the controller 110 queries the actions database 122 for an action associated with the ID2 corresponding to the packet B. If an action associated with the ID2 is found in the actions database 122, then the controller 110 performs the action with respect to the packet B.

In some embodiments, the controller 110 is configured to, after performing an action, inform the PPE 104 that issued the instruction indicating the action that the action has been performed by the controller 110. The PPE 104 is configured to, after issuing an after issuing an instruction indicating an action to be taken with respect to a packet, wait until receiving an acknowledgement indicating that the action has been performed by the controller 110 before performing certain other actions with respect to the packet. For example, the PPE 104 waits until receiving the acknowledgment before accessing a stateful data structure to obtain information corresponding to the packet. As such the ordering unit 106 serves to maintain a correct order for accessing the stateful structure such that the correct information corresponding to the packet is retrieved from the stateful structure, in an embodiment. As another example, the PPE 104 waits until receiving the acknowledgment before issuing another instruction corresponding to the packet to the ordering unit 106, in an embodiment. In an embodiment, the PPE 104 performs other processing operations (e.g., other processing operations with respect to the packet) while waiting to receive the acknowledgment from the ordering unit 106. The PPE 104 then checks whether the acknowledgment has been received before performing an operation for which the acknowledgement is needed, such as accessing a stateful data structure with respect to the packet, or issuing another instruction to the ordering unit 106 with respect the packet, in an embodiment.

In an embodiment, the ordering unit 106 is configured to, when a packet reaches the head of a queue 114, to provide a notification to the PPE 104 that is processing the packet to notify the PPE 104 that the packet has reached the head of the queue 114. The PPE 104 is configured to wait until such notification for a packet is received from the ordering unit 106 before performing certain operations on the packet, such as accessing a centralized resource (e.g., stateful data structure) accessible by multiple ones of the PPEs 104 for performing the certain operation with respect to the packet. Then, after the operation has been completed for the packet, the PPE 104 sends an update to the reordering unit 106 indicating a class update for the packet, in an embodiment. The ordering unit 106 receives the class update and moves the packet from the head of the queue 114 in which the packet is currently queued to a new queue 114 corresponding to the new class indicated by the class update, allowing the next packet in the queue 114 in which the packet was queued to move to the head of the queue 114. Then, the ordering unit 106 sends a notification the PPE 104 that is processing the next packet in the queue 114 that notifying the PPE 104 that the next packet is now at the head of the queue 114 and allowing the PPE 104 that is processing the next packet to perform a certain operation with respect to the next packet, such as accessing the centralized resource for performing the certain operating with respect to the next packet.

Additionally or alternatively, the ordering unit 106 allows the processors 104 to poll the ordering unit 106 to obtain a list of packets that are currently at heads of the respective queues 114 in which the packets are currently queued in the ordering unit 106. In an example embodiment and scenario, a PPE 104 receives the list of packets that are currently at the heads of the queues 114 and determines whether a certain packet being processed by the PPE 104 is currently at the head of the queue 114. If so, then the PPE 104 performs the action (e.g., accesses a stateful data structure to obtain data corresponding to the packet). On the other hand, if the packet is currently not at the head of the queue 114 in which the packet is queued in the ordering unit 106 (e.g., the packet is not indicated as one of the packets in the list of packets that are at the heads of the queues 114), then the PPE 104 does not perform the action, and waits until the packet moves to the head of the queue 114 to perform the action. For example, the PPE 104 continues polling the ordering unit 106 until the list of packet that are currently at heads of the respective queues 114, obtained from the ordering unit 106, indicates that the packet is now at the head of the queue 114, in an embodiment.

Figure 3:
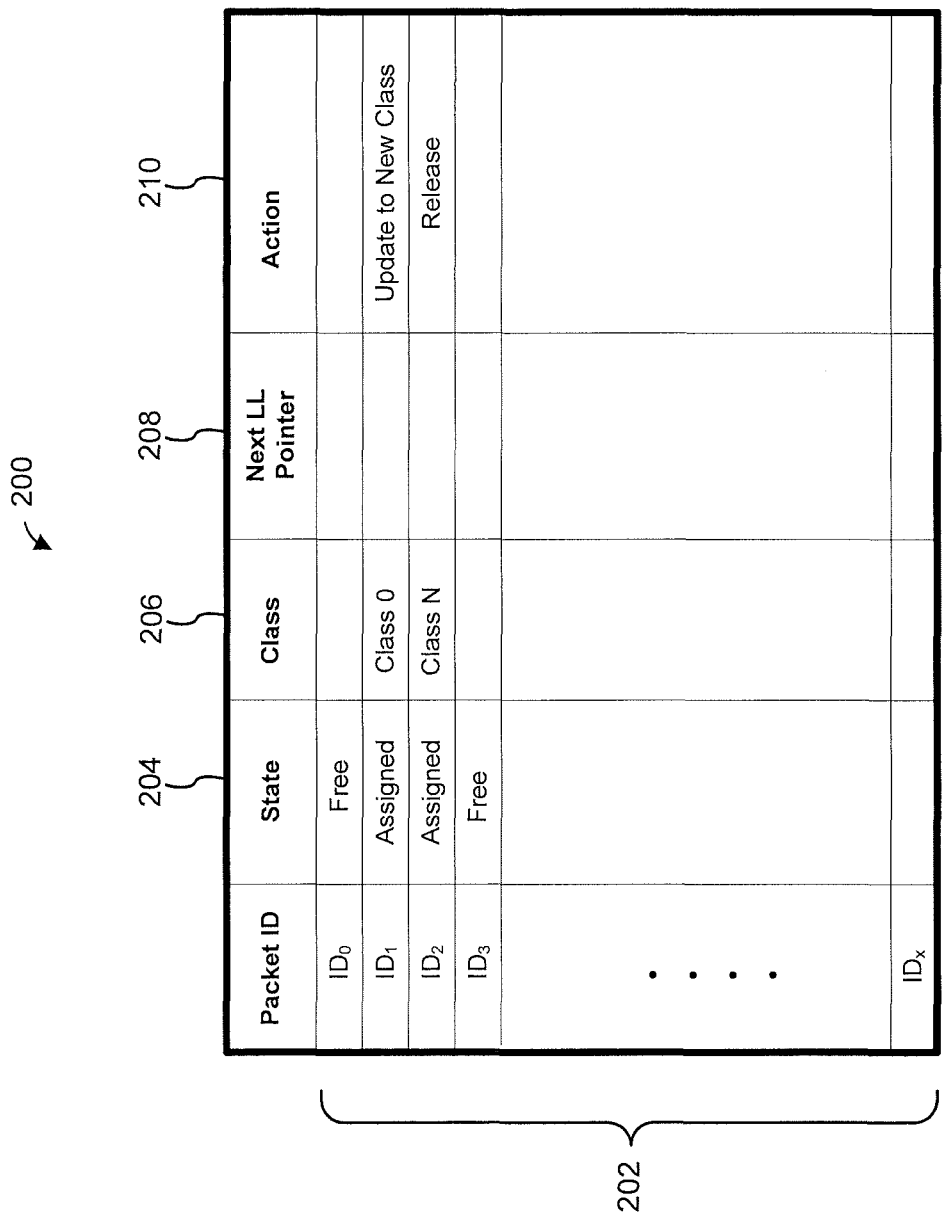
FIG. 3 is an example actions table/database used by an ordering unit to store actions to be taken with respect to packets, according to an embodiment.

FIG. 3 is an example actions table or database 200 used by an ordering unit, such as the ordering unit 106 of FIG. 2, according to an embodiment. The table/database 200 is generally configured to store associations between actions and packets with respect to which the actions are to be taken by the ordering unit, and stores additional information associated with the packets and/or the queues used for queuing the packets, in some embodiments. In an embodiment, the table/database 200 is stored in a memory (e.g., random access memory or other suitable memory) included in or coupled to the controller 110 of FIG. 2. In an embodiment, the table/database 200 corresponds to the actions database 122 of FIG. 2. In another embodiment, the table/database 200 is used by other suitable components of the of the network device 100 or by network devices other than the network device 100. For ease of explanation, the table/database 200 is described below with reference to the network device 100 of FIG. 1.

The table/database 200 includes a plurality of entries 202. Each entry 202 is associated with a respective packet ID and is used to store various data or information corresponding to the packet ID. In the example embodiment of FIG. 2, each row 202 includes a status field 204 for indicating whether the packet ID is currently associated with a packet being processed by the network device 100 or is currently free and, accordingly, is available for assignment to new packets entering the network device 100. For those packet IDs that are currently associated with packets being processed by the network device 100, a class field 206 in the table 200 stores an indication of class (e.g., a default class or a non-default class) currently associated with the packet ID. A next LL pointer field 208 includes a pointer or another indication of a memory address at which the next packet in the queue corresponding to the class indicated in the class field 204. Additionally, each entry 202 of the table/database 200 includes an action field 210 used to store actions to be taken with respect to the packets when the packets reach the heads of the respective queues 114 in which the packets are queued in the ordering unit 106.

In an embodiment, the controller 110 is configured to store at least the actions to be taken with respect to packets that are not at heads of queues 114 in which the packets are queued in the actions fields 210 of the appropriate entries 200 associated with the packet IDs corresponding to the packets. The controller 110 is configured to query the table/database 200 to determine whether a packet that newly arrived to the heads of the queues 114 has an associated action stored in the table/database 200. If such an action corresponding to a particular packet (which is at the head of the queue 114 in which the packet is queued) is found in the table/database 200, the action is taken with respect to the particular packet, in an embodiment. If no such action is found, then the packet remains at the head of the queue 114 until an instruction indicating an action to be take with respect to the particular packet is received from the PPEs 104, in an embodiment.

In some embodiments, the table/database 200 omits at least some of the fields 204-210 illustrated in FIG. 3 and/or includes other fields not illustrated in FIG. 3. For example, each entry 202 of the table/database 200 includes a descriptor database field for storing a packet descriptor corresponding to the packet ID associated with the entry 202. The controller 110 is configured to receive, form a PPE 104, a packet descriptor associated with a packet along with an instruction indicating that processing of the packet has been completed by the PPE 104. The controller 110 is configured to store the packet descriptor in the packet descriptor field of the entry 202 associated with the packet ID corresponding to the packet, and to send the packet descriptor to an appropriate target port 112 when the packet ID corresponding to the packet is at the head of the queue 114 in which the packet is queued, in an embodiment.

Figure 4:
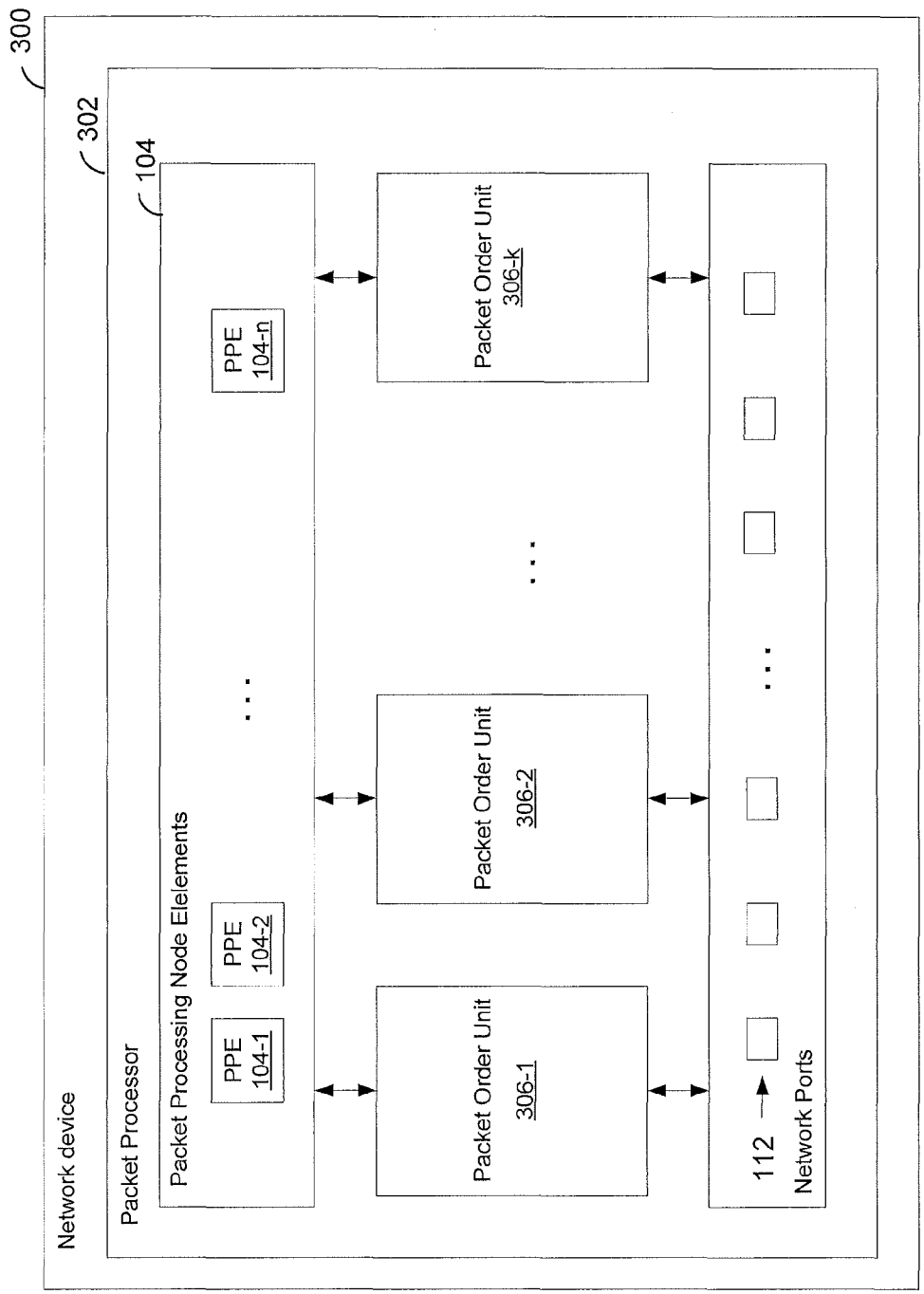
FIG. 4 is a block diagram of a network device configured in accordance with another embodiment of the present disclosure.

FIG. 4 is a block diagram of a network device 300 configured in accordance with another embodiment of the present disclosure. The network device 300 is similar to the network device 100 of FIG. 1 except that the network device 300 includes a plurality of ordering units 306-1 to 306-$k$, wherein each of the ordering units 306-1 to 306-$k$ operates on packets received via respective subsets of source ports 112 with each of the subsets including one or more of the source ports 112. In this embodiment, each of the ordering units 106 is responsible for maintaining order of packets (e.g., packets belonging to a same data flow or a same class of packets) received via the one or several of the source ports 112. In an embodiment, each of the ordering units 306-1 to 306-$k$ is the same as or similar to the ordering unit 106 of FIG. 1. In an embodiment, each of the ordering units 306-1 to 306-$k$ operates on a plurality of class queues including one or several default class queues. Each of the ordering units 306-1 to 306-$k$ is configured to enqueue packets received by the network device 100 via a source port (or ports) 112 in respective queues corresponding to respective packet classes and according to the order in which the packets were received by the network device 300, to communicate with the PPEs 104 to receive instructions indicating actions to be taken with respect to the packets, and to perform the actions when the packets are at the heads of the queues in which the packets are queued, thereby maintaining the order of packets.

Generally speaking, data flows for which order needs to be maintained in a network device such as the network device 300 share at least a common source port 112. Thus, the network device 300 can include any suitable number of ordering units 306, such as a number of ordering units 306 needed or desired to support a particular bandwidth of the network device 300. Accordingly, packet ordering operations in the network device 300 can be easily scaled to support larger bandwidths in the network device 300 for example by adding additional ordering units 306 such that each ordering unit 306 is responsible for maintaining order of packets received via fewer of the source ports 112 allowing the ordering units 306 to more quickly perform various processing operations, in at least some embodiments.

Figure 5:
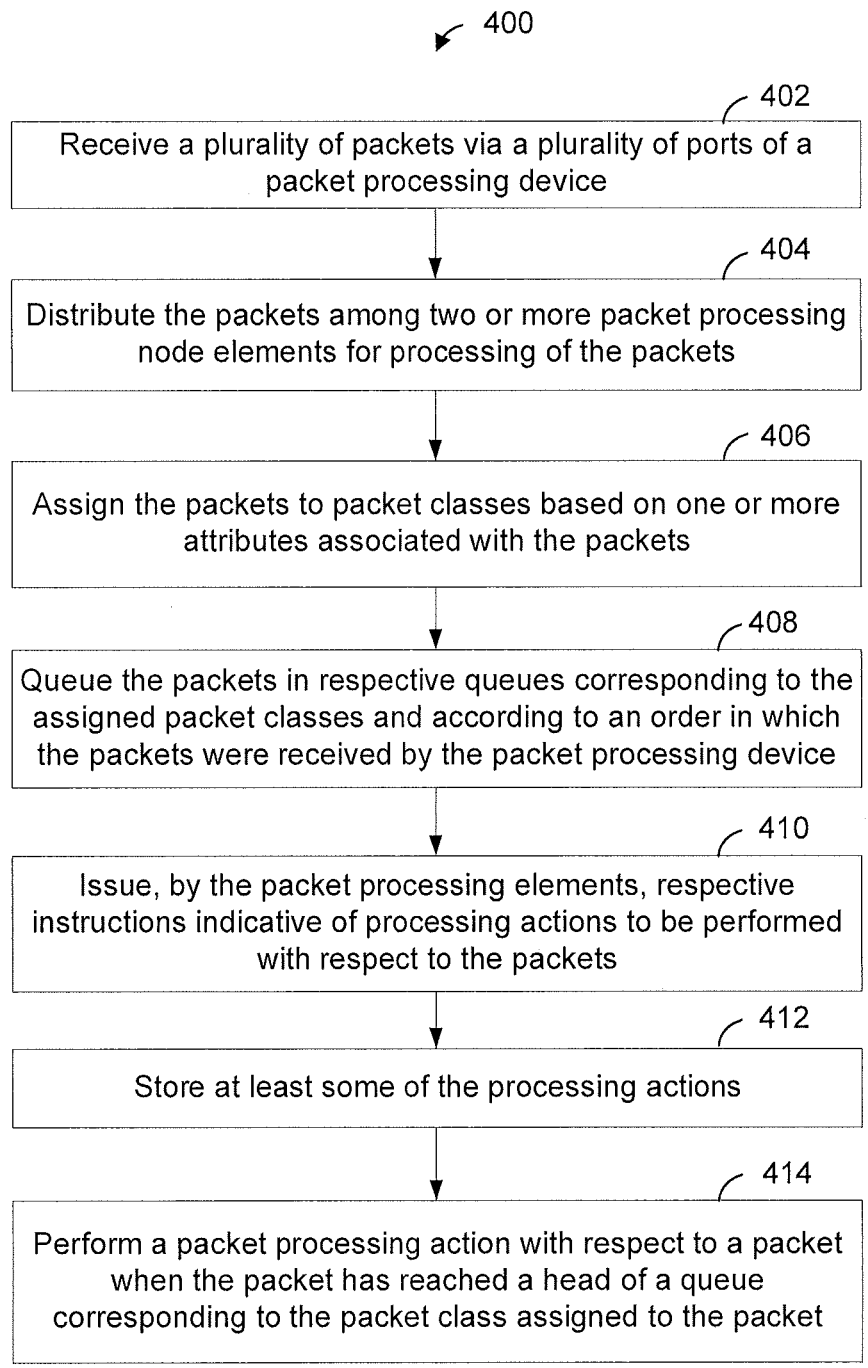
FIG. 5 is a flow diagram of an example method for preserving an order of packets in a network device, according to an embodiment.

FIG. 5 is a flow diagram of an example method 400 for preserving an order of packets in a packet processing device, according to an embodiment. The method 400 is implemented by the network device 100 of FIG. 1, in an embodiment. The method 400 is implemented by the network device 300 of FIG. 4, in another embodiment. In other embodiments, the method 400 is implemented by another suitable network device.

At block 402, a plurality of packets are received via a plurality of ports of the packet processing device. At block 404, the packets are distributed to two or more packet processing node elements for processing of the packets by the packet processing node elements.

At block 406 the packets are assigned to respective packet classes. In an embodiment, a packet processing node element determines a packet class corresponding to a packet during processing of the packet. In an embodiment, a packet class is determined for a packet based on one or more attributes associated with the packet, such as one or more parameters included in the packet or otherwise associated with the packet.

At block 408, the packets are queued in respective queues corresponding to the packet classes assigned to the packets. In an embodiment, packets in each queue are queued according to an order in which the packets were received by the packet processing device. In an embodiment, the packets are initially queued in one or more respective default class queues, and at least some of the packets are moved to particular classes to which the packets correspond after the particular classes have been determined for the packets. In another embodiment, at least some of the packets are moved to new classes before particular classes to which the packets correspond have been determined for the packets, for example when it takes a relatively long time to determine the particular class to which the packet corresponds. In this embodiment, the packet is moved to a tail of a queue corresponding to any of one of the classes, thereby unblocking other packets queued in the queue in which the packet was originally queued. The packet class for the packet is updated at a later time, when the particular packet class corresponding to the packet has been determined, in some embodiments and scenarios.

At block 410, respective instructions indicative of actions, such as updating a class for a packet, forwarding a packet, dropping a packet, etc., to be performed with respect to the packets are issued by the packet processing elements. At block 412, at least some of the actions are in a suitable manner associated with the packets to which the actions correspond. For example, associations between the actions and the packets to which the actions correspond are stored in a memory. In an embodiment, actions are stored at block 412 if the packets to which the actions correspond are not at heads of their respective queues. In another embodiment, actions are stored at block 412 even if the packets to which the actions correspond are at the heads of their respective queues.

At block 414, a processing action is performed with respect to a packet. In an embodiment, the processing action is performed at block 414 if the corresponding packet is at the head of the queue in which the packet is queued. Because actions are performed with respect to packets at the heads of their respective queues, order of the packets in maintained within the queues, in an embodiment.

At least some of the various blocks, operations, and techniques described above may be implemented utilizing hardware, a processor executing firmware instructions, a processor executing software instructions, or any combination thereof. When implemented in hardware, the hardware may comprise one or more discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method for preserving an order of packets in a packet processing device, the method comprising:
    receiving a plurality of packets via a plurality of ports of the packet processing device;
    distributing the packets, that were received via the plurality of ports, among two or more packet processing node elements for processing of the packets;
    assigning the packets to respective packet classes based on one or more attributes associated with the packets, wherein each packet class corresponds to a group of packets for which an order in which the packets were received is to be preserved when transmitting the packets;
    queuing the packets in respective queues corresponding to the assigned packet classes and according to an order in which the packets were received by the packet processing device;
    issuing, by the packet processing node elements, respective instructions indicative of processing actions to be performed with respect to the packets;
    storing, in a memory, indications of at least some of the processing actions indicated by the corresponding instructions issued by the packet processing node elements; and
    when a packet has reached a head of a queue corresponding to the class associated with the packet,
        retrieving, from the memory, an indication of a processing action to be performed with respect to the packet, and
        performing the processing action with respect to the packet.

2. The method of claim 1, further comprising performing, by the packet processing elements, processing operations on the packets, including performing at least some processing operations independently of respective locations of the packets in the respective queues.

3. The method of claim 1, wherein queuing the packets in respective queues includes, prior to assigning the packets to respective packet classes, queuing the packets in one or more default class queues.

4. The method of claim 3, wherein queuing the packets in one or more default class queues comprises queuing the packets in respective default class queues corresponding to respective source ports via which the packets were received by the packet processing device.

5. The method of claim 1, further comprising assigning respective packet IDs to the packets, wherein queuing the packets in the respective queues comprises queuing the packet IDs assigned to the packets in the respective queues.

6. The method of claim 5, wherein assigning respective packet IDs comprises assigning respective IDs from a pool of non-sequential free packet IDs.

7. The method of claim 5, wherein performing the processing action with respect to the packet comprises one of (i)

updating a class corresponding to the packet to a new packet class assigned to the packet, (ii) forwarding the packet, or (iii) dropping the packet.

8. The method of claim 7, wherein forwarding the packet comprises:
causing the packet to be sent to a target port for transmission of the packet via the target port;
removing a packet ID corresponding to the packet from a queue in which the packet ID is queued; and
returning the packet ID to a pool of free packet IDs.

9. The method of claim 7, wherein updating the class corresponding to the packet to the new packet class comprises moving the packet ID corresponding to the packet to a tail of a queue corresponding to the new packet class.

10. The method of claim 1, further comprising providing, to the packet processing elements, notifications indicating packets that are at heads of respective queues, and wherein the packet processing elements are configured to delay performing some packet processing operations on a packet until the packet is at the head of a queue.

11. A network device, comprising:
a plurality of network ports configured to receive and to transmit packets on a network;
a plurality of packet processing node elements configured to process packets received via the network ports; and
an ordering unit configured to:
distribute packets, that were received via the plurality of network ports, among two or more packet processing node elements for processing of the packets, wherein the packet processing node elements are configured to process the packets and to assign the packets to respective packet classes based on one or more attributes associated with the packets, each packet class corresponding to a group of packets for which an order in which the packets were received is to be preserved when transmitting the packets;
queue the packets in respective queues corresponding to the assigned packet classes and according to an order in which the packets were received by the packet processing device;
receive, from the packet processing node elements, respective instructions indicating packet processing actions to be taken with respect to the packets;
store, in a memory, indications of at least some of the processing actions indicated by the corresponding instructions received from the packet processing node elements; and
when a packet has reached a head of a queue corresponding to the class associated with the packet,
retrieve, from the memory, an indication of a processing action to be performed with respect to the packet, and perform the packet processing operation with respect to the packet.

12. The network device of claim 11, wherein the packet processing node elements are configured to perform at least some processing operations independently of respective locations of the packets in the respective queues.

13. The network device of claim 11, wherein the ordering unit is configured to, before the packets are assigned to the packet classes, queue the packets in respective one or more default class queues.

14. The network device of claim 13, wherein the ordering unit is configured to queue the packets in respective one or more default class queues corresponding to respective source ports via which the packets were received by the packet processing device.

15. The network device of claim 11, wherein the ordering unit is further configured to assign respective packet IDs to the packets, and wherein queuing the packets in the respective queues comprises queuing the packet IDs assigned to the packets in the respective queues.

16. The network device of claim 15, wherein the ordering unit is configured to assign the respective packet IDs from a pool of non-sequential free packet IDs.

17. The network device of claim 15, wherein the processing action that the ordering unit is configured to perform with respect to the packet comprises one of (i) updating a class corresponding to the packet to a new packet class assigned to the packet, (ii) forwarding the packet, or (iii) dropping the packet.

18. The network device of claim 17, wherein the ordering unit is configured to forward the packet at least by:
causing the packet to be sent to a target port for transmission of the packet via the target port;
removing the packet ID corresponding to the packet from the queue in which the packet ID is queued; and
returning the packet ID to a pool of free packet IDs.

19. The network device of claim 17, wherein the ordering unit is configured to update the class corresponding to the packet to the new packet class at least by moving the packet ID corresponding to the packet to a tail of a queue corresponding to the new packet class.

20. The network device of claim 11, wherein the ordering unit is further configured to provide, to the packet processing elements, notifications indicating packets that are at heads of respective queues, and wherein the packet processing elements are configured to delay performing at least some packet processing operations on a packet until the packet is at the head of a queue.

* * * * *